Figures 1, 2:
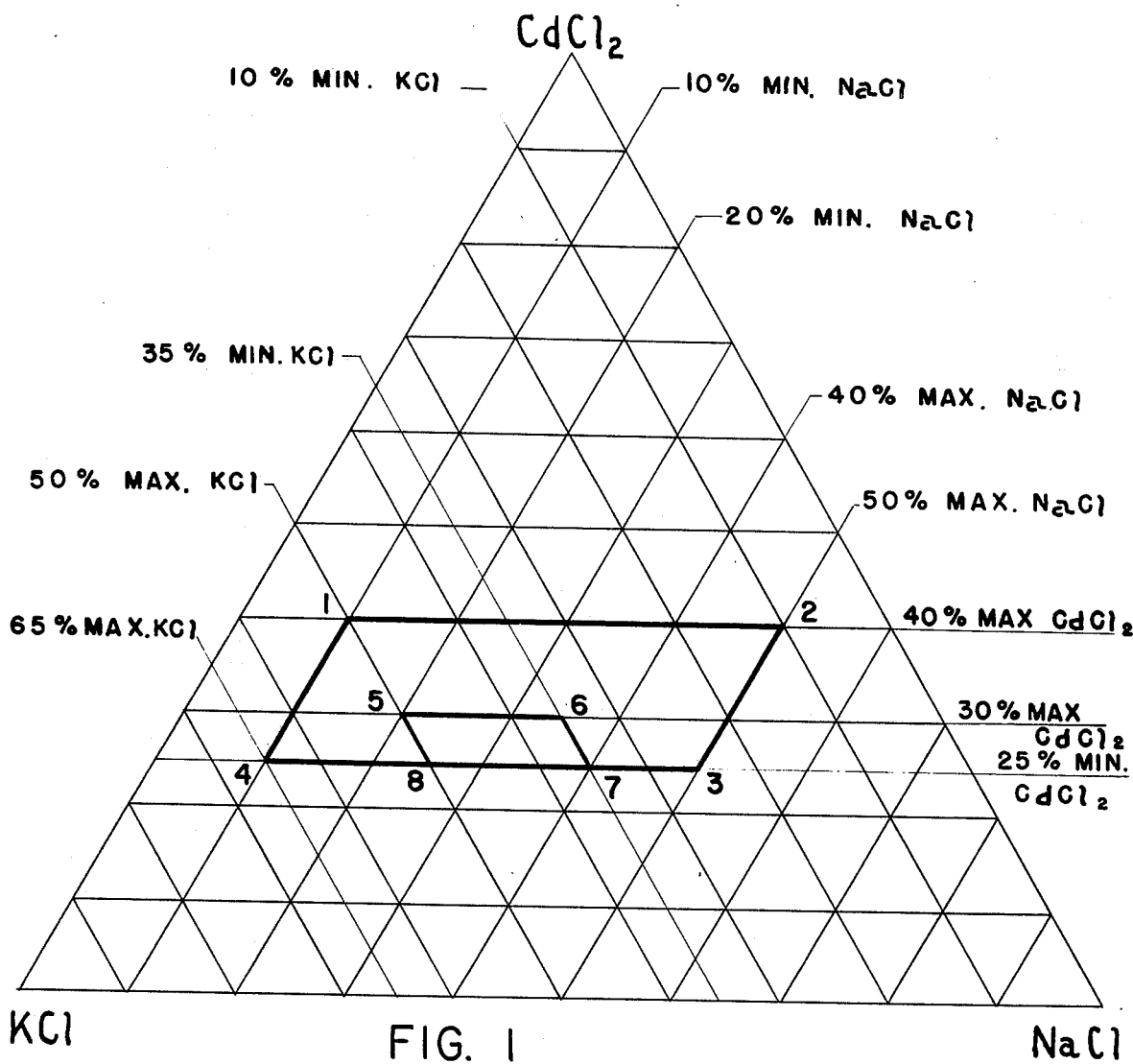

United States Patent [19]

Zellhoefer

[11] 4,056,662
[45] Nov. 1, 1977

[54] THERMAL CELLS AND ELECTROLYTE COMPOSITION THEREFOR

[75] Inventor: Glenn F. Zellhoefer, Normal, Ill.

[73] Assignee: National Union Electric Corporation, Stamford, Conn.

[21] Appl. No.: 406,542

[22] Filed: Jan. 27, 1954

[51] Int. Cl.² ............................................. H01M 6/36
[52] U.S. Cl. ..................................... 429/112; 429/199
[58] Field of Search ................... 136/4 F, 4, 83.1, 84, 136/90, 153, 153.1, 153.5; 429/112, 199

[56] References Cited

U.S. PATENT DOCUMENTS

| | | | |
|---|---|---|---|
| 856,162 | 6/1907 | Kitsee | 136/83.1 |
| 2,595,814 | 5/1952 | Rich et al. | 136/4 |

FOREIGN PATENT DOCUMENTS 740,001  11/1932  France ................................ 136/153

OTHER PUBLICATIONS

International Critical Tables, vol. IV, pp. 41 and 80, 1st Ed. (1928) McGraw-Hill Book Co., Inc.

Primary Examiner—Leland A. Sebastian
Attorney, Agent, or Firm—Merriam, Marshall & Bicknell

EXEMPLARY CLAIM

1. A fused electrolyte cell embodying an electrolyte consisting essentially of a mixture of 25 to 40 mole percent $CdCl_2$; 10 to 50 mole percent NaCl; and 10 to 65 mole percent KCl, containing proportions of each component substantially as determined by a three system diagram thereof; and a depolarizing agent.

6 Claims, 1 Drawing Figure

PERCENTAGE COMPOSITION BY WEIGHT

| POINT NO. | $CdCl_2$ | NaCl | KCl |
|---|---|---|---|
| 1 | 63.0 | 5.0 | 32.0 |
| 2 | 66.6 | 26.6 | 6.8 |
| 3 | 48.9 | 31.2 | 19.9 |
| 4 | 45.8 | 5.8 | 48.4 |
| 5 | 52.9 | 11.2 | 35.9 |
| 6 | 54.2 | 20.1 | 25.7 |
| 7 | 48.1 | 24.5 | 27.4 |
| 8 | 46.9 | 15.0 | 38.1 |

PERCENTAGE COMPOSITION BY WEIGHT

| POINT NO. | CdCl$_2$ | NaCl | KCl |
|---|---|---|---|
| 1 | 63.0 | 5.0 | 32.0 |
| 2 | 66.6 | 26.6 | 6.8 |
| 3 | 48.9 | 31.2 | 19.9 |
| 4 | 45.8 | 5.8 | 48.4 |
| 5 | 52.9 | 11.2 | 35.9 |
| 6 | 54.2 | 20.1 | 25.7 |
| 7 | 48.1 | 24.5 | 27.4 |
| 8 | 46.9 | 15.0 | 38.1 |

*INVENTOR.*
GLENN F. ZELLHOEFER
BY

THERMAL CELLS AND ELECTROLYTE COMPOSITION THEREFOR

This invention relates to thermal cells and electrolytes for use in thermal cells.

Known electrolytes consisting of various inorganic salts which remain solid and non-conducting at all storage temperatures are hygroscopic. This entails considerable difficulty in the manufacture of such cells as the presence of moisture in the cell leads to rapid deterioration thereof.

An electrolyte embodying my invention is non-hygroscopic. This property is obtained without any sacrifice in the performance of the cell.

A principal object of the invention is to provide a new and improved electrolyte which is particularly adapted for use in thermal cells.

Another object of the invention is to provide a non-hygroscopic electrolyte which is particularly suitable for use in a thermal cell.

Another object of the invention is to provide a new and improved thermal cell containing a non-hygroscopic electrolyte.

Other objects and advantages of the invention will be apparent from a consideration of the following specification taken in conjunction with the accompanying drawing of which there is one sheet, and wherein:

FIG. 1 is a three system diagram showing the composition of electrolytes which come within the scope of the invention; and FIG. 2 is a chart showing the percentage composition by weight of the components of a number of electrolytes embodying the invention.

In thermal cells the electrolyte which is solid and non-conducting at all storage temperatures, melts and becomes conducting when the cell is heated to some elevated temperature and electrical energy may then be withdrawn from the system.

I have discovered a non-hygroscopic electrolyte for use in a thermal cell which consists essentially of a mixture of 25 to 40 mole percent $CdCl_2$; 10 to 50 mole percent NaCl; and 10 to 65 mole percent KCl; and wherein the mixture contains proportions of each component substantially as determined by a three system diagram of such components which is shown in FIG. 1.

The parallelogram 1234 indicates various proportions of $CdCl_2$, NaCl and KCl which come within the range of my invention, while the parallelogram 5678 indicates preferred proportions of such components which I have found to be useful.

According to one example the electrolyte comprises 25 mole percent $CdCl_2$, 10 mole percent NaCl, and 65 mole percent KCl.

According to another example the electrolyte consisted of 40 mole percent $CdCl_2$, 10 mole percent NaCl, and 50 mole percent KCl.

According to another example the electrolyte consisted of 40 mole percent $CdCl_2$, 50 mole percent NaCl, and 10 mole percent KCl.

As another example the electrolyte may consist of 25 mole percent $CdCl_2$, 50 mole percent NaCl, and 25 mole percent KCl.

Examples of preferred electrolytes are: Example 1 — 25 mole percent $CdCl_2$, 25 mole percent NaCl, 50 mole percent KCl; example 2 — 30 mole percent $CdCl_2$, 20 mole percent NaCl, 50 mole percent KCl; example 3 — 30 mole percent $CdCl_2$, 35 mole percent NaCl, 35 mole percent KCl; example 4 — 25 mole percent $CdCl_2$, 40 mole percent NaCl, 35 mole percent KCl; example 5 — 53.5 mole percent $CdCl_2$, 20.3 mole percent NaCl, 26.2 mole percent KCl.

In FIG. 2 the table shows the percentages by weight of the compositions indicated by the numerals 1 through 8 inclusive of FIG. 1.

Tests of various electrolytes within the indicated range were made with the electrochemical system $Ni/CdCl_2$-NaCl-KCl/Mg with a depolarizer such for example as $V_2O_5$ or $K_2CrO_4$ dissolved in the electrolyte. The cathode was 0.005 inch grade A nickel and the anode was magnesium. These tests show that the performance of thermal cells embodying my invention is comparable to corresponding Ni/KCl-LiCl/Mg systems in which $V_2O_5$ or $K_2CrO_4$ was used as the depolarizing agent.

While I have described a preferred embodiment of my invention, it is capable of modification and I do not wish to be limited to the precise details set forth, but desire to avail myself of such changes as fall within the scope of the following claims.

1. A fused electrolyte cell embodying an electrolyte consisting essentially of a mixture of 25 to 40 mole percent $CdCl_2$; 10 to 50 mole percent NaCl; and 10 to 65 mole percent KCl, containing proportions of each component substantially as detemined by a three system diagram thereof; and a depolarizing agent.

2. A fused electrolyte cell embodying an electrolyte consisting essentially of a mixture of 25 to 30 mole percent of $CdCl_2$; 20 to 40 mole percent of NaCl; and 35 to 50 mole percent of KCl, containing proportions of each component subtantially as determined by a three system diagram thereof; and a depolarizing agent.

3. A fused electrolyte cell embodying an electrolyte consisting essentially of a mixture of 25 mole percent $CdCl_2$; 25 mole percent NaCl; and 50 mole percent KCl; and a depolarizing agent.

4. A fused electrolyte cell embodying an electrolyte consisting essentially of a mixture of 30 mole percent $CdCl_2$; 20 mole percent NaCl; and 50 mole percent KCl; and a depolarizing agent.

5. A fused electrolyte cell embodying an electrolyte consisting essentially of a mixture of 30 mole percent $CdCl_2$; 35 mole percent NaCl; and 35 mole percent KCl; and a depolarizing agent.

6. A fused electrolyte cell embodying an electrolyte consisting essentially of a mixture of 25 mole percent $CdCl_2$; 40 mole percent NaCl; and 35 mole percent KCl; and a depolarizing agent.

* * * * *